Aug. 26, 1969  R. H. DAY  3,463,915
CHEMICAL LIGHT INDICATOR FOR EMERGENCY ILLUMINATION
Filed Feb. 9, 1968  2 Sheets-Sheet 1
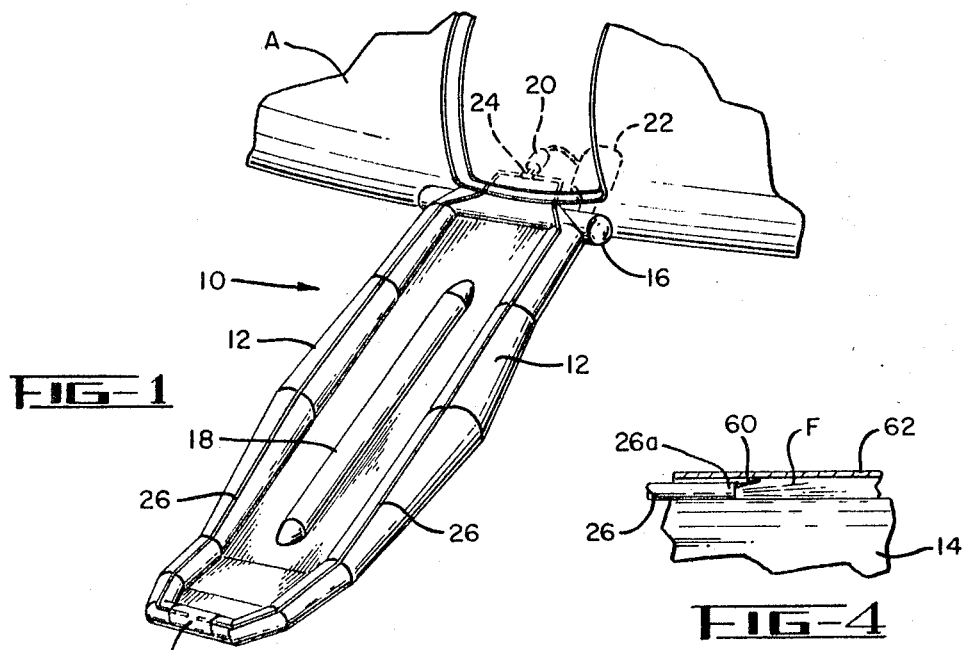
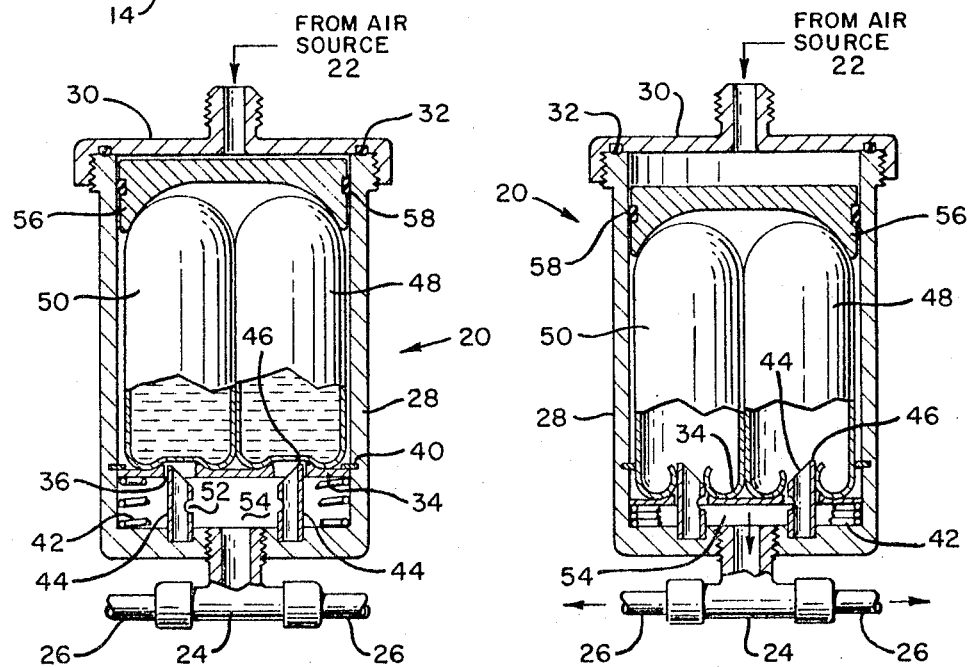
INVENTOR.
RONALD H. DAY
BY Gregg & Stidham
ATTORNEYS Aug. 26, 1969 R. H. DAY 3,463,915
CHEMICAL LIGHT INDICATOR FOR EMERGENCY ILLUMINATION
Filed Feb. 9, 1968 2 Sheets-Sheet 2

INVENTOR.
RONALD H. DAY

BY *Gregg & Stidham*
ATTORNEYS

United States Patent Office 3,463,915
Patented Aug. 26, 1969

3,463,915
CHEMICAL LIGHT INDICATOR FOR
EMERGENCY ILLUMINATION
Ronald H. Day, Mill Valley, Calif., assignor to Industrial Covers, Inc., San Francisco, Calif., a corporation of California
Filed Feb. 9, 1968, Ser. No. 704,476
Int. Cl. F21v 9/16
U.S. Cl. 240—2.25                                        10 Claims

ABSTRACT OF THE DISCLOSURE

A chemical light indicator for emergency illumination comprising a pair of frangible containers supported within a housing on a movable platform which when depressed allows pointed members to puncture the containers causing chemicals within them to mix and form a luminescent fluid which flows into translucent vessels, e.g., tubes, connected to the housing indicating an area to be illuminated. The tubes are particularly useful in illuminating aircraft exits, rafts, air-dropped articles, and the sides of an aircraft emergency escape chute and, when such include inflatable beam members, the means for depressing and puncturing the containers may be driven by the inflating pressure fluid.

---

This invention relates to a chemical light indicator for emergency illumination and, more particularly, to a device for producing a chemiluminescent fluid and delivering it to translucent tubes or other vessels which provide temporary illumination for an escape path, as, for example, an aircraft escape chute.

When it becomes necessary for emergency evacuation, as from a grounded airplane, such emergency situations may occur in areas away from either interior or exterior light, even though on or adjacent to a runway. Hence, when the emergency occurs at night, the evacuating passengers are often required to plunge into total darkness in absence of some emergency lighting. Of course, if emergency lighting such as battery operated portable lamps are available, such may be useful in such emergencies. However, it occasionally happens that the disposition of the plane makes it difficult to illuminate exits, rafts, or the full length of the slide and, if a person is required to hold the lamp while others evacuate, it is difficult to do so without at least partially blocking the escape hatchway.

It is, therefore, an object of this invention to provide a device for luminously indicating an escape route sufficiently to guide evacuees of the proper escape path.

It is a further object of this invention to provide a device for illuminating outlines of doors, rafts or an aircraft escape chute.

It is a further object of this invention to provide a device for illuminating an escape route without requiring a separate source of electrical power.

It is a further object of this invention to provide a device for illuminating the side rails of an aircraft escape chute, or raft tubes which device is activated by the same source of pressure fluid used to inflate the chute or raft support beams.

It is a further object of this invention to provide a chemical source of emergency light wherein the chemical ingredients are stored separately and preserved in a self-contained unit until ready for use.

In carrying out this invention, I provide a housing containing a pair of containers, each with a chemical ingredient which, when mixed, produces a chemiluminescent fluid. The containers are supported on a movable platform having openings therein with sharp cutting members which extend through the openings, when the containers and platform are depressed to puncture the containers. Any suitable means, such as a spring, a frangible member, a shear ring or a displacement ring, normally holds the platform in an elevated position clear of the puncture members, but a piston carried in the housing above the containers is driven downward by pneumatic pressure to puncture the containers and force out of the housing and into the device to be illuminated. In the case of emergency illumination for inflatable devices, such as aircraft escape chutes or life rafts the piston may be actuated by pneumatic pressure from the same source that is used to inflate the tubular side rails of the aircraft escape chute or the tubular frames of a life raft. In such applications the pressure fluid may be delivered through a by-pass line from the source of inflating pressure fluid and into the housing above the piston.

Other objects and advantages of this invention will become apparent from the description following when read in conjunction with the accompanying drawings wherein:

FIG. 1 is an isometric view showing an inflated escape chute and including an emergency lighting system forming a part of this invention ad here utilized to illuminate the side rails of the escape chute;

FIG. 2 is a vertical section view through the operating device for the emergency lighting system showing the chemical containers in normal storage position;

FIG. 3 is a vertical section view of the operating device during actuation and with the chemical containers punctured to mix the ingredients for chemiluminescent lighting;

FIG. 4 is a view partially in section showing the end of one of the tubes;

Figure 5:
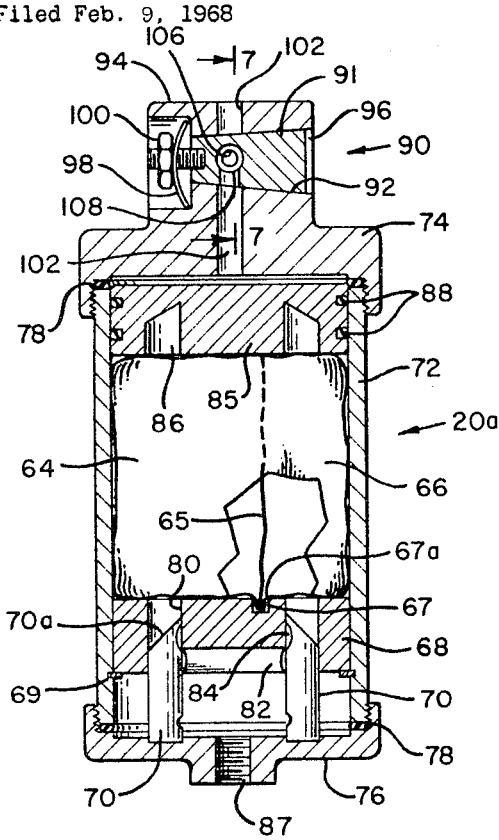
FIG. 5 is a vertical section view through another embodiment of the operating device for an emergency lighting system showing proportionating chemical containers in normal storage position.
Figure 6:
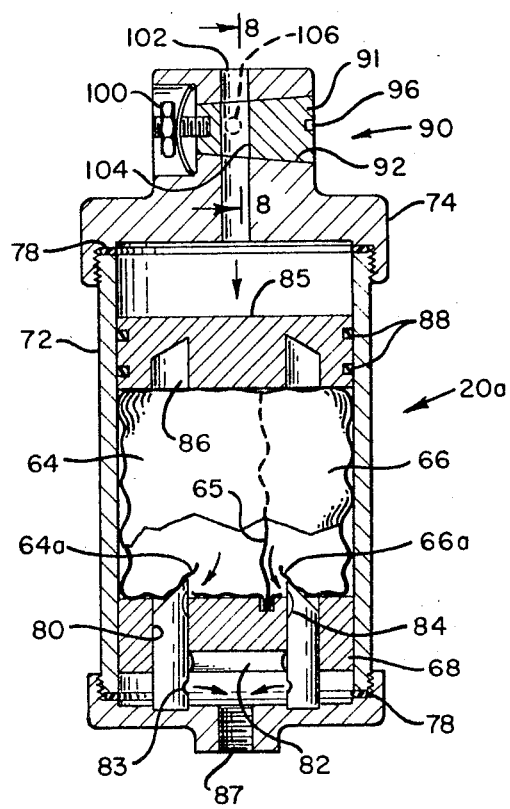
FIG. 6 is a vertical section view of the operating device of FIG. 5 during actuation and with the chemical containers punctured to mix the ingredients for chemiluminescent lighting.

Referring now to FIG. 1, the object to be illuminated, such as the escape slide 10, is shown in inflated condition extended from the side of an aircraft A and includes a pair of side beams or rails 12, a bottom support member and cushion 14 in communication with the side rails and a top transverse bearing member 16 of extra width which bears against the side of the aircraft to increase stability of the inflated chute 10. Preferably, the chute also includes a central divider tube 18 which is used in larger aircraft to convert the slide into a double escape chute and greatly increase the possible evacuation rate.

The chemical mixing device 20 is activated by air pressure from the pressure source 22 which is selectively operated to inflate the escape slide. As will be seen, the mixing device operates to force a luminescent liquid through a T coupling 24 and then laterally and downward through translucent tubes 26, each of which terminates at the lower cross support member 14.

Referring now to FIGS. 2 and 3 showing the chemical mixing and activating device 20 in greater detail, it comprises a housing 28 which may be closed at the top by a cap 30, as by threading it onto the upper end of the housing and sealing it by any suitable means such as an O-ring 32. Slidably contained within the housing at the lower end thereof is a movable platform 34 through which are formed a pair of openings 36. The normal, upper position of the platform is determined by a stop member which, for example, may be in the form of a split ring 40 which is snapped into place in a groove around the housing 28, and the platform is biased into its upper extended position shown in FIG. 2 as by means of a suitable coil spring 42. Protruding upward from the bottom wall of the housing is a pair of tubular puncture members 44 having pointed upper ends 46 sufficiently sharp to puncture the frangible containers 48 and 50 of plastic or the like which are supported on the platform 40. Normally, the pointed tips 46 are below the level of the platform, but when the platform is forced into the depressed position shown in FIG. 3 the containers 48 and 50 are punctured and the contents allowed to flow through the tubular punctured members 44 and out the ports 52 to a mixing zone 54 wherein they are combined chemically.

The containers 48 and 50 are preferably formed of a frangible plastic material such as Nylon or the like, and each contains a chemical which, when combined, produce a chemiluminescent fluid. A number of such chemical ingredients are described in M. K. Ranhut U.S. Patent No. 3,325,417 granted June 13, 1947, to American Cyanamid Company. For example, one container or bag may contain a mixture of oxyalye chloride, ethyl acetate and anthracene, and the other container may contain a solution of urea peroxide. When the contents of the two bags are mixed a reaction takes place generating light. Other examples are set out in the aforesaid Ranhut patent.

Referring now to FIG. 3, the means for forcing the containers 48 and 50 and the platform 34 downward may include a piston 56 slidably mounted within the housing and sealed therewith as by means of an O-ring. Hence, when the piston is driven downward, it forces the bags 48 and 50 against the puncture points 48, causing the contents to be intermixed within the mixing chamber 54 and chemically combined. Then, as the piston continues downward, it forces the chemical out under pressure through the T coupling 24 carried at the lower end of the housing 28 and through the translucent tubing 26 connected thereto. As shown in FIG. 1, the source of pressure fluid 22 may be that which inflates the support members 12, 14 and 16 of an aircraft escape chute 10 and, hence, as the escape chute is inflated, the mixing device 20 is actuated to provide temporary lighting through the tubing along the side rails 12.

Referring now to FIG. 4, I have shown the terminal end 26a of a tube which is mounted on the lower inflatable support member 14 and includes some means to exhaust or accommodate the air within the tubes that is forced out by the luminous fluid. This may take a number of forms, but the embodiment illustrated includes a flapper type check valve 60 which has a sufficient amount of sealing force to contain the bulk of the chemiluminescent fluid, but which may be overcome by the initial high pressure to evacuate air from the tube and to spray a quantity of the fluid onto the lower support member 14 to provide a lighted landing for the evacuees. Preferably, the spraying of the liquid is done within a protective envelope 62 of transparent plastic so that the landing cushion 14 will not be moistened.

While this invention has been described in a typical application of use, i.e., for illuminating an escape chute, it will be readily apparent that it will also be useful in a wide variety of applications for emergency lighting. For example, it could be used to illuminate the outline of the aircraft door and/or an exit sign above it, or it could be employed to illuminate the outlet of a raft to facilitate boarding and subsequent sighting by rescuers.

Referring now to FIGS. 5 to 8 there is illustrated another embodiment of this invention wherein the frangible containers 64 and 66 are supported on a platform 68 which, in turn, is normally carried on a shear ring or displacement ring 69 so that the containers are above the puncture members 70. As shown, the frangible containers may actually comprise a single compartmented bag with two chamebrs 64 and 66 of different volumes selected to give the desired ratio by volume of the chemicals employed. An orienting key 67 comprising a protrusion along the wall 65 separating the compartments is seated in a complementary slot 67a so that the compartments 64 and 66 are properly disposed with respect to the puncture members 70.

In addition, the housing 20a comprises a main cylinder 72 to the ends of which are threaded top and bottom end caps 74 and 76 with suitable seals, such as O-rings 78 rendering the housing 20a fluid tight. With the simplified structure shown an assortment of cylinders 72 of various lengths may be provided and selected according to the amount of chemical, and hence the lighting capacity desired.

Bores 80 through the platform 68 receive the puncture members 70 and the platform is free to move, when the shear ring or displacement ring 69 yields, almost to the bottom of the housing 20a for complete evacuation of the housing. A lateral passage 82 formed in the platform insures a mixing chamber and outlet passage throughout the full stroke and inwardly directed outlet ports 83 deliver the chemicals directly to the lateral passage 82. Additional ports 84 are provided in the puncture members to insure a path of fluid flow as shown by the arrows despite partial or complete blockage of the top port 70a by plastic 64a, 66a (FIG. 6) partially severed from the containers. The piston 85 is provided with recesses 86 to accommodate the puncture members 70, so that the piston 85 can move down to compress the containers 64 and 66 between it and the platform 68, again to insure a complete stroke for complete evacaution of the chemicals through the port 87. Suitable seals, such as O-rings 88 seal around the piston.

If desired, a control valve 90 of the plug type 91 may be carried in a bore 92 through an extension 94 on the top cap with operation effected by any suitable means such as by engagement of a key or a screwdriver (not shown) in a slot 96 at one end. As shown the plug 91 and complementary bore 92 may be tapered and the plug is retained by a spring washer 98 biased against a nut 100 carried on a threaded extension.

Figure 7:
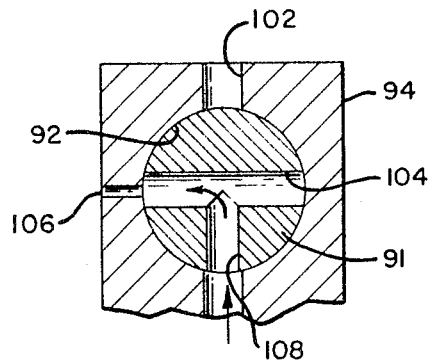
FIG. 7 is a section view taken along line 7—7 of FIG. 5 and showing a valve in closed position.
Figure 8:
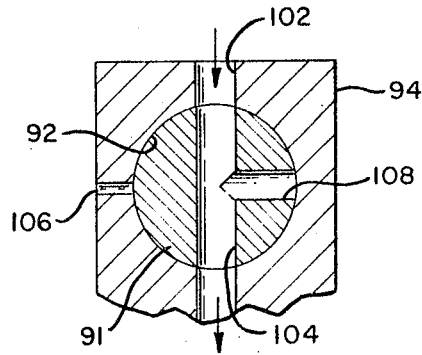
FIG. 8 is a section view taken along line 8—8 of FIG. 6 showing the valve in open position.

As shown best in FIGS. 7 and 8 the upper cap extension 94 is bored to provide aligned flow passages 102 and a complementary flow passage is bored through the plug 91. In addition a bleed hole 106 is bored through a wall of the extension which, when the valve is in its closed position shown in FIG. 7 communicates with the plug flow passage 104. When the plug is in its closed position a lateral bleed passage 108 is in alignment with the flow passage 102 into the housing 20a. Hence, in the event there is any leakage around the plug 91 there can be no pressure build-up within the housing 20a and fluid will be bled off to the atmosphere through lateral plug flow passage 108 and bleed hole 106. This will prevent inadvertent operation of the piston 84 and premature mixing of the chemicals.

While I have described my invention in conjunction with a preferred embodiment thereof, it will be obvious that modifications and changes may be made within the spirit and scope of this invention as defined by the claims appended hereto.

Having described my invention, I claim:

1. A device for emergency illumination comprising:
   a housing;
   a pair of frangible containers within said housing;
   a mixing zone within said housing;
   selectively operated means in said housing for puncturing said containers and for expelling the contents of said containers into said mixing zone;
   a translucent tube in communication with said mixing zone and disposed to indicate an escape route; and
   chemical substances in said containers adapted when mixed to form a chemiluminescent field.

2. The device defined by claim 1 wherein said selectively operated means includes:
a sharp puncturing member opposite each of said containers for puncturing said container when said container is forced against it, and
yieldable means normally holding said containers displaced from said sharp members.

3. The device defined by claim 2 wherein said selectively operated means further includes forcing means for forcing said containers against said sharp members.

4. The device defined by claim 3 wherein said forcing means includes:
a piston slidably carried in said housing and operable, when moved in one direction, to have one side thereof engage said containers to bias said containers toward said sharp members; and
means for introducing pressure fluid into said housing on the other side of said piston to move said piston in said one direction.

5. The device defined by claim 1 including:
a movable platform having openings therein in said housing,
said containers being supported on said platform with each container being exposed through one of said openings,
said openings being in communication with said mixing zone,
a sharp puncturing member opposite each of said openings so that when said platform is depressed said puncturing members extend through said openings to puncture said containers, and
yieldable means normally holding said platform in an extended position with said containers free of said puncturing means.

6. The device defined by claim 5 including:
a piston slidably carried in said housing operable when moved in one direction so that one side thereof engages said containers and biases them toward said sharp puncturing members, and
means for introducing pressure fluid into said housing on the other side of said piston.

7. The device defined by claim 6 wherein:
said emergency illumination is adapted for use with an inflatable member having a source of pressure fluid, and
said last-named means includes a conduit from said source to said housing.

8. The device defined by claim 7 wherein said inflatable member comprises an aircraft escape chute, and
there is a pair of translucent tubes in communication with the mixing zone of said housing, each tube extending down one side of said chute to terminate at the lower end thereof.

9. The device defined by claim 8 including:
check valves at the lower ends of said tubes and wherein
said lower ends are disposed to spray fluid onto the surface of said chute at the lower end thereof.

10. The device defined by claim 4 including
means for preventing a build-up of pressure on said other side of the piston.

References Cited

UNITED STATES PATENTS

| | | | |
|---|---|---|---|
| 3,239,406 | 3/1966 | Coffman et al. | 250—71 |
| 3,147,885 | 9/1964 | Sheridan | 116—124.9 |
| 2,410,277 | 10/1946 | Farris | 250—71 |
| 2,079,008 | 5/1937 | Goss | 102—37.8 |

CARL D. QUARFORTH, Primary Examiner

M. J. McGREAL, Assistant Examiner

U.S. Cl. X.R.

193—25; 244—137; 250—71